UNITED STATES PATENT OFFICE.

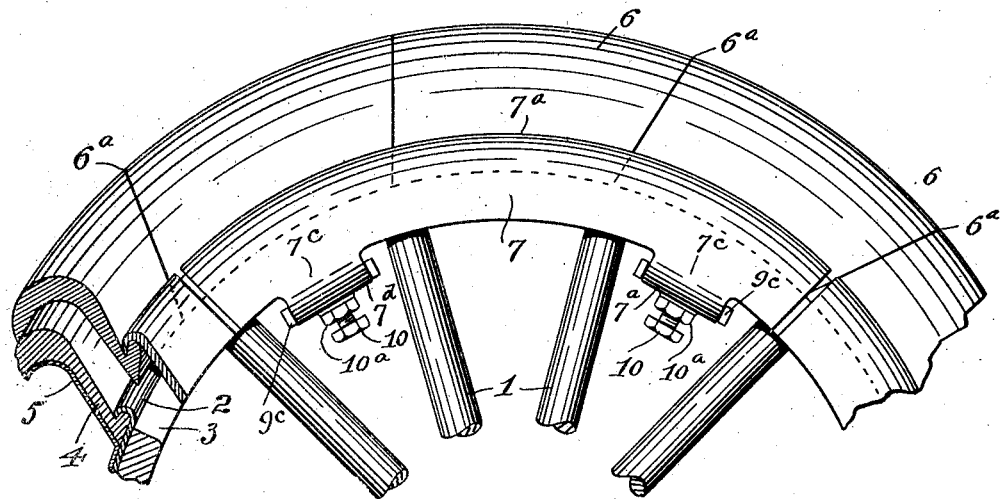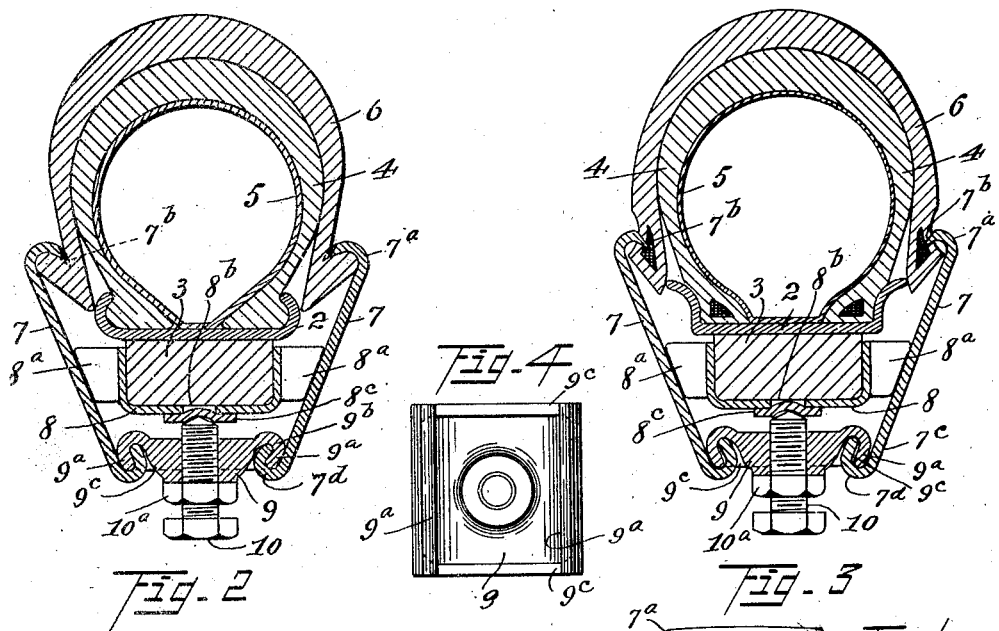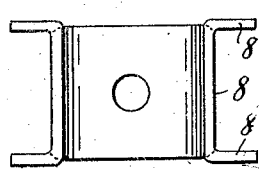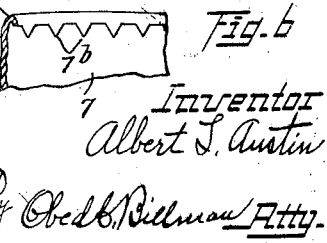

ALBERT L. AUSTIN, OF CLEVELAND, OHIO, ASSIGNOR TO THE STANDARD TIRE PROTECTOR COMPANY, OF CLEVELAND, OHIO, A CORPORATION OF DELAWARE.

TIRE.

1,381,094. Specification of Letters Patent. Patented June 7, 1921.

Application filed July 21, 1919. Serial No. 312,412.

*To all whom it may concern:*

Be it known that I, ALBERT L. AUSTIN, a citizen of the United States, residing at Cleveland, in the county of Cuyahoga and State of Ohio, have invented certain new and useful Improvements in Tires, of which the following is a specification.

My invention relates to improvements in pneumatic tires, and more particularly to that class or type in which a protective casing made up of a plurality of abutting sections cut from old or used tire casings is attached about an ordinary tire casing for the purpose of protecting the same as well as extending its wear or mileage, the invention being particularly designed and adapted for utilizing old or used tire casings.

More specifically speaking, my invention relates to improved means for independently securing and adjusting such protective casing sections, such means preferably comprising a plurality of radially movable spaced tire carrying members or split rims adapted to detachably secure the sections of the protective casing and adjust the same through the medium of improved relatively fixed and movable clamping members adapted to be readily attached to and detached from any ordinary wheel felly.

The primary object of the invention is to provide a generally improved structure of the character mentioned which will be exceedingly simple in construction, cheap of manufacture and efficient in use.

A further and very important object of the invention is the provision of demountable clamp members which may not only be attached to any ordinary wheel felly without in any way marring or injuring the same, but the provision of improved radially movable tire engaging members having improved heel engaging hooks equally adapted to engage the heels of tire casings of either the straight side type or of the so-called "clencher" type.

With the above mentioned and other ends in view, the invention consists in the novel construction, arrangement and combination of parts, hereinafter described, illustrated in some of its embodiments in the accompanying drawings, and particularly pointed out in the appended claims.

Referring to the drawings, forming a part of this specification, Figure 1, is a fragmentary side elevation of an ordinary wheel and pneumatic tire equipped with the radially divided protective casing and the improved means for mounting and securing the same.

Fig. 2, an enlarged cross sectional view of the same attached to a tire and protective casing of the "clencher" type.

Fig. 3, a similar view of the same attached to a tire and protective casing of the straight side type.

Fig. 4, a top plan view of one of the relatively movable clamp or tire rim engaging shackle members, detached, the clamp adjusting device or bolt being removed for the purpose of clearer illustration.

Fig. 5, a view of the under side of one of the relatively fixed or demountable felly engaging clamp members.

Fig. 6, a fragmentary side elevation of the inner side of one of the tire carrying rims, and illustrating in particular the spaced heel penetrating and engaging hooks.

Similar numerals of reference designate like parts throughout all the figures of the drawings.

The wheel 1, rim 2, and felly 3, may be of any suitable and convenient form, and so likewise the casing 4, and inner tube 5. In the present instance, the rim 2, and casing 4, are of the clencher type, as shown in Figs. 1 and 2, of the drawings, and of the straight side type, as shown in Fig. 3, of the drawings.

The protective casing comprises a plurality of abutting casing sections 6. The casing sections 6, may be cut into suitable lengths from old or used tires, but are preferably of like form and dimensions and relatively short in length, thereby forming a number of heat contracting and expanding joints 6ª, such sections and joints lessening the danger of great frictional heat and heat and air expansion, resulting in blow outs. The joints 6ª, preferably extend in a direction slightly inclined from radial lines drawn from the wheel center, as shown most clearly in Fig. 1.

As a means of securing and adjusting the casing sections 6, radially movable spaced tire engaging members or rims 7, are provided, said members or rims 7, being mounted at the sides of the wheel felly and terminating in casing engaging hook members 7ª, the latter being preferably in the form of clencher members adapted to conform to and engage with the clencher portions of the casing sections when the latter are of the clencher type.

As a means, however, of more effectually engaging the heel portions of the casing, and particularly as a means of engaging the heel portions of a casing of the straight side type, as shown in Fig. 3, of the drawings, the heel engaging members 7ª, are preferably provided about their inner periphery with a series of spaced heel penetrating teeth or prongs 7ᵇ, as shown most clearly in Fig. 6, of the drawings.

As a means of movably securing the tire securing members or split rims 7, wheel felly engaging members are provided, said members, in the present instance, being in the specific form of relatively fixed felly engaging clamp members 8, provided with a felly receiving recess and terminating at their sides in guide members 8ª.

As a means of forming a seat or guide portion for the clamping device or bolt and the relatively movable tire and tire rim engaging clamp members, hereinafter referred to, the demountable or felly engaging clamp members 8, are preferably provided with openings 8ᵇ, adapted to form a seat for a concavo-convex shaped clamp thrust receiving ring 8ᶜ. It will be seen that the guide members 8ª, at the sides of the wheel felly rest against the inner sides of the tire casing engaging members or rims 7, and centralize and stabilize the latter in their various adjustments, as hereinafter referred to.

As a means of detachably connecting the tire section engaging members 7, to the wheel felly, and particularly as a means of adjusting the same independently of each other, the members or rims 7, are provided about their inner periphery with extension members 7ᶜ, terminating in inwardly extending hooks 7ᵈ, the latter being adapted to be engaged by oppositely extending hooks 9ª, formed at the sides of the relatively movable clamp members 9. The clamp members 9, in the present instance, are in the specific form of clamp shackles and the movable clamps 9, are provided with centrally located threaded openings adapted to receive and contain clamping and adjusting bolts 10, the latter being adapted to be seated upon the thrust receiving ring 8ᶜ, of the relatively fixed clamp members and the adjusting devices or bolts 10, being adapted to be secured in adjusted position by means of lock nuts 10ª.

As a means of preventing relative circumferential movement between the casing engaging members 7, and the hooks 9ª, of the relatively movable clamp or shackles, the hook receiving recesses 9ᵇ, of the latter are preferably closed at their ends by means of end walls or abutments 9ᶜ, (see Fig. 4) the abutments 9ᶜ, being adapted to abut against the ends of the hooks 7ᵇ, of the radially movable members or rims 7.

By reason of the construction above described and illustrated in the accompanying drawings, it will be obvious that the clamping devices or bolts 10, not only serve to attach the parts to or detach the parts from the wheel felly but also act to firmly draw the tire casing section engaging members or rims 7, toward the wheel center and the centrally located clamping devices 10, being located centrally, the pulling strains and stresses are equalized on the two sides, and it will also be obvious that the guide members 8ª, will stabilize the parts as against lateral movement during the varying exigencies of actual service.

From the foregoing description, taken in connection with the accompanying drawings, the operation and advantages of my invention will be readily understood.

Having thus described some of the embodiments of my invention, what I claim and desire to secure by Letters Patent, is,—

1. A pneumatic tire, comprising a casing, a wheel felly, spaced tire securing split rims on opposite sides of the latter, relatively movable shackle clamping members extending across the inner side of said wheel felly, and means on said shackle members for detachably and adjustably connecting the latter to said wheel felly and to said tire securing rims.

2. A pneumatic tire, comprising a protective tire casing, a wheel felly, tire casing securing split rims on opposite sides of the latter, relatively movable clamping members, and adjusting means on said movable clamping members seated on the inner side of said wheel felly for detachably and adjustably connecting said clamping members on said wheel felly and detachably connecting the same to said tire casing securing rims.

3. In a pneumatic tire, a wheel felly, relatively fixed felly clamp members provided with guides, movable clamp members on said fixed clamp members carrying tire heel engaging members in engagement with said guides, and clamping and adjusting devices between said fixed and movable clamp members whereby said parts are moved relatively for adjusting said tire engaging members.

4. A protective device for pneumatic tires, comprising a protective casing provided with heel members, tire securing members having prongs penetrating said tire heel members, felly engaging fixed and movable shackle members, said fixed shackle members being provided with guides and said movable shackle members being provided with means for detachably connecting said tire securing members and for connecting and adjusting said fixed and movable shackle members.

5. In a protective device for pneumatic tires, a wheel felly and rim provided with a protective casing, demountable clamp members provided with recesses adapted to receive and engage said felly members and provided at their sides with hook receiving recesses, and spaced tire securing and adjusting members movable on said guides, said tire securing members being provided at their sides with hook receiving recesses, said tires securing members being provided at one side with hooks adapted to engage the heel portions of said casing and at the other with hook extensions adapted to rest in said hook receiving recesses of said movable clamps.

6. In a protective device for pneumatic tires, a wheel felly and rim carrying a protective casing, demountable clamp members provided with recesses receiving said felly members and provided with guides, movable clamp members supported on adjusting bolts resting on said demountable felly engaging clamps and provided at their sides with hooks terminating in end stops, and spaced tire carrying members on said guides, said tire carrying members being provided at one side with spaced prongs penetrating the heel portions of said casing and at the other with extensions provided with hooks engaging said clamp hooks and abutting against said end stops.

7. In a pneumatic tire, a supplementary sectional rim provided with a flange curved to conform to and engage the tire heel member, said flange terminating in spaced tire heel penetrating prongs.

8. In a protective device for pneumatic tires, a supplemental sectional rim provided with a hook-shaped flange curved to engage a tire heel member of a tire casing, said flange terminating in spaced prongs adapted to penetrate the heel portion of a casing of the straight side type.

9. In a protective device for pneumatic tires, a supplemental sectional rim provided with a hook-shaped flange curved to engage a tire heel member of a tire casing, said flange terminating in spaced projections adapted to engage the heel portion of a casing of the straight side type.

In testimony whereof I have affixed my signature.

ALBERT L. AUSTIN.